United States Patent Office 3,258,502
Patented June 28, 1966

3,258,502
POLYCYCLIC HYDROCARBON PRODUCTION
Lawrence G. Cannell, Lafayette, Calif., assignor to Shell Oil Company, New York, N.Y., a corporation of Delaware
No Drawing. Filed May 18, 1964, Ser. No. 368,344
8 Claims. (Cl. 260—666)

This invention relates to a process for the production of certain polycyclic hydrocarbons. More particularly it relates to an improved method for the production of pentacyclo(8.2.1.1$^{4,7}$.0$^{2,9}$.0$^{3,8}$)hydrocarbons containing a ring system of 14 carbon atoms.

The dimerization of bicyclo(2.2.1)hepta-2,5-diene to produce pentacyclo(8.2.1.1$^{4,7}$.0$^{2,9}$.0$^{3,8}$)tetradeca-5,11-diene is known in the art. For example, Bird et al., Tetrahedron Letters, No. 11, 373 (1961), describe the production of this pentacyclic compound and related products by dimerization processes in the presence of certain metal carbonyls, e.g., iron carbonyls. However, low yields of pentacyclic product are observed. It would be of advantage to provide a more efficient method for the production of such dimer products.

It is an object of the present invention to provide an improved method for the production of certain polycyclic hydrocarbons. A more particular object is to provide a method for the production of compounds containing a pentacyclo(8.2.1.1$^{4,7}$.0$^{2,9}$.0$^{3,8}$)carbocyclic ring system of 14 carbon atoms, which ring system contains ethylenic linkages between the 5 and 6 and the 11 and 12 carbon atoms. A specific object is to provide an improved method for the production of pentacyclo(8.2.1.1$^{4,7}$.0$^{2,9}$.0$^{3,8}$)-tetradeca-5,11-diene.

It has now been found that these objects are accomplished by the process of dimerizing bicyclo(2.2.1)hepta-2,5-dienes in the presence of tetrakisphosphite nickel complexes as catalyst.

The catalysts that have been found to be suitable in the process of the invention are nickel catalysts wherein the nickel is in a reduced oxidation state, preferably the zero oxidation state, and is stabilized by complex formation with tertiary phosphite ligands. The phosphite ligands appear to be capable of donating an electron pair to the metal to form a coordinate bond therewith and to simultaneously have the ability to accept electrons from the metal, thereby imparting stability to the resulting complex. Best results are obtained when the phosphite catalyst is a tetrakis(trihydrocarbylphosphite)nickel (0) catalyst wherein the hydrocarbyls independently have from 1 to 10 carbon atoms. One class of such compounds is represented by the formula [P(OR)$_3$]$_4$Ni (0) wherein R independently is hydrocarbyl free from non-aromatic unsaturation, e.g., alkyl, cycloalkyl or aryl, having from 1 to 10 carbon atoms, preferably from 1 to 8, as illustrated by alkyl R groups such as methyl, ethyl, propyl, sec-butyl, tert-amyl, isoamyl, 2-ethylhexyl, octyl, decyl, benzyl and β-phenylethyl; cycloalkyl R groups such as cyclobutyl, cyclopentyl, cyclohexyl and 1,2,4-trimethylcyclohexyl; and aryl R groups such as phenyl, tolyl, xylyl, p-ethylphenyl and m-tert-butylphenyl.

An additional class of suitable catalysts is represented by the formula [(RO)$_2$P—O—R'—O—P(OR)$_2$]$_2$Ni (0) wherein R has the previously stated significance and R' is a divalent radical corresponding to R. It will be appreciated that although only two ligands are associated with each nickel moiety, each ligand is bidentate in that each ligand contains two phosphite moieties. There are therefore four phosphite moieties associated with each nickel moiety and such catalysts are suitably included within the generic term "tetrakis(trihydrocarbylphosphite)nickel (0)." In general, however, tetrakis(trihydrocarbylphosphite)nickel (0) catalysts containing only monodentate ligands are the preferred class.

Exemplary tetrakis(trihydrocarbylphosphite)nickel (0) catalysts include

Tetrakis(tributylphosphite)nickel (0),
Tetrakis(triphenylphosphite)nickel (0),
Tetrakis(trimethylphosphite)nickel (0),
Tetrakis[tri(p-tolyl)phosphite]nickel (0),
Tetrakis(diphenylbenzylphosphite)nickel (0),
Bis(tritolylphosphite)bis(trihexylphosphite)nickel (0),
Tetrakis(amyldibutylphosphite)nickel (0),
Bis(tetraphenyl ethylenediphosphite)nickel (0),
Bis(tetramethyl trimethylenediphosphite)nickel (0),
Bis(tetraethyl tetramethylenediphosphite)nickel (0)

and the like. In general, tetrakis(trialkylphosphite)nickel (0) catalysts are preferred over the corresponding complexes wherein the hydrocarbyl substituents of the phosphite ligands are cycloalkyl or aryl, and particularly useful as catalyst is tetrakis[tri(2-ethylhexyl)phosphite]-nickel (0).

The nickel complex catalysts are conveniently prepared by any of several methods, e.g., according to the disclosure of U.S. 3,102,899 issued September 3, 1963, to Cannell, or the disclosure of copending U.S. application of Mullineaux Serial No. 275,517, filed April 25, 1963. Although the nickel catalysts are preferably employed as preformed materials, the catalysts are alternatively produced in situ as by the reaction of a nickel (I) or nickel (II) compound with a suitable reducing agent in the presence of the desired trihydrocarbylphosphite ligand.

The bicycloheptadiene reactant contains only C and H atoms and is a substituted or unsubstituted bicyclo-(2.2.1)hepta-2,5-diene wherein any substituents present are hydrocarbyl substituents having from 1 to 10 carbon atoms and having no non-aromatic unsaturation. One class of such bicycloheptadienes has from 7 to 67 carbon atoms, preferably from 7 to 35, and is represented by the formula

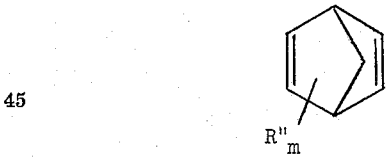

wherein R" independently is hydrocarbyl free from non-aromatic unsaturation, i.e., is alkyl, cycloalkyl or aryl, and has from 1 to 10 carbon atoms, preferably 1 to 7. The term $m$ represents the number of R" substituents present on the ring and is a whole number from 0 to 6 inclusive, preferably from 0 to 4. Preferred compounds of the above formula have at least one ethylenic linkage, the carbon atoms of which are unsubstituted with R" groups.

Illustrative of hydrocarbyl R" groups which are free from non-aromatic unsaturation are alkyl groups including methyl, ethyl, propyl, tert-butyl, isoamyl, hexyl, octyl, decyl, benzyl and β-phenylethyl; cycloalkyl groups such as cyclopentyl, cyclohexyl, cyclooctyl, 2,4,5-trimethylcyclohexyl and 2,3-diethylcyclopentyl; and aryl groups including phenyl, tolyl, xylyl, p-ethylphenyl and m-tert-butylphenyl. In general, alkyl substitutents are preferred over analogous cycloalkyl or aryl groups when non-hydrogen ring substituents are present.

The bicyclic reactants are conveniently prepared by the condensation of a cyclopentadiene hydrocarbon and an alkyne hydrocarbon. For example, bicyclo(2.2.1)-hepta-2,5-diene is prepared from cyclopentadiene and acetylene as by the method described in U.S. 2,875,256 issued February 24, 1959, to Hyman et al.

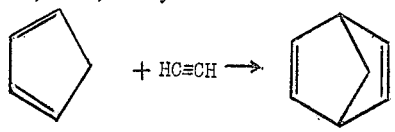

While the above equation depicts the formation of unsubstituted bicyclo(2.2.1)hepta-2,5-diene, it will be appreciated that by employing appropriately substituted reactants, a variety of substituted bicycloheptadienes is produced. Best results are obtained in the process of the invention, however, when the bicycloheptadiene reactant is unsubstituted, i.e., is bicyclo(2.2.1)hepta-2,5-diene.

The process of the invention comprises dimerizing the bicycloheptadiene by contacting the bicyclic reactant with the tetrakisphosphite nickel (0) catalyst and maintaining the mixture at a somewhat elevated temperature until reaction is complete. The nickel complex catalyst is employed in catalytic amounts. Amounts of the nickel catalyst from about 0.0001% mole to about 5% mole based upon the bicycloheptadiene are suitable, although amounts of catalyst from about 0.001% mole to about 1% mole on the same basis are preferred.

The process of the invention may be conducted in the presence of or in the substantial absence of reaction solvent. When solvent is employed, solvents that are liquid at reaction temperature and pressure and are inert to the bicyclic reactant and the product produced therefrom are suitable. Illustrative of such solvents are the hydrocarbons, particularly aromatic hydrocarbons such as benzene, toluene and xylene, and the ethers, particularly cyclic ethers such as tetrahydrofuran, tetrahydropyran and dioxane. In contrast with other metal complexes which have previously been employed in similar processes, the tetrakis(trihydrocarbylphosphite)nickel (0) catalysts of the invention are soluble in the hydrocarbon reactant, and no solvent is required. In the preferred modification of the process of the invention, no substantial amount of reaction solvent is employed.

Although the dimerization may be conducted in a continuous manner as by contacting the bicyclic reactant with the catalyst during passage through a tubular reactor maintained at reaction temperature, best results are obtained by conducting the reaction in a batchwise manner as in an autoclave or similar reactor. The reactant and catalyst are charged to the reactor and the reaction mixture is maintained at an elevated temperature and customarily an elevated pressure. Reaction temperatures that are suitably employed for the dimerization process vary from about 80° C. to about 200° C. although the temperature range from about 110° C. to about 185° C. is preferred. Suitable reaction pressures vary from about 1 atmosphere to about 100 atmospheres. Particular advantage is taken of the pressures generated when the reaction mixture is heated to reaction temperature in a sealed reaction vessel, which pressures vary from about 2 atmospheres to about 20 atmospheres.

The polycyclic products of the invention are useful in a variety of applications. The ethylenic linkages are employed as reactive sites for polymerization or copolymerization processes, or are hydrated or hydroxylated to form alcohols from which useful conventional derivatives are prepared. The unsaturated products are useful dienophiles in reactions with many dienes, or alternatively may be epoxidized to form useful epoxy resin precursors. The products additionally are useful as special solvents and as components of high energy fuels.

To further illustrate the process of the invention, the following examples are provided. It should be understood that they are not to be regarded as limitations, as the teachings thereof may be varied as will be understood by one skilled in this art.

Example I

To a 1 liter autoclave equipped with a stirrer was charged 706 g. (7.7 moles) of bicyclo(2.2.1)hepta-2,5-diene containing 0.3 g. of 2,6-di-tert-butyl-4-methylphenol as an antioxidant, and 6.25 g. (0.004 mole) of tetrakis[tri(2-ethylhexyl)phosphite]nickel (0). The reaction mixture was maintained at a temperature of 165–178° C. for 3.5 hours in an atmosphere of nitrogen. Distillation of 681 g. of the product mixture gave 543 g. of bicycloheptadiene dimer, pentacyclo(8.2.1.1.$^{4,7}$.0$^{2,9}$.0$^{3,8}$)tetradeca-5,11-diene, 19.6 g. of recovered feed and 118 g. of distillation bottoms. The conversion of the bicycloheptadiene was 98% with a selectivity of 82% for dimer production. The pentacyclotetradecadiene had a boiling point of 131.5–133.5° C. at 20 mm. and a refractive index, $n_D^{20}$, of 1.5412–1.5428. The mass spectrum showed the dimer product to have a molecular weight of 184.

*Analysis.*—Calc. for $C_{14}H_{16}$: C, percent w. 91.25; H, percent w. 8.75; bromine number, eq./100 g. 173. Found: C, percent w. 91.1; H, percent w. 8.8; bromine number, eq./100 g. 186.

A nuclear magnetic resonance spectrum showed the dimer product to consist principally of three isomers of pentacyclo(8.2.1.1$^{4,7}$.0$^{2,9}$.0$^{3,8}$)tetradeca-5,11-diene. The lowest boiling isomer, designated isomer A, was concentrated during distillation and purified by fractional crystallization and recrystallization from methanol to give the pure isomer, M.P. 67–68° C. The two higher boiling isomers, designated B and C, were concentrated by gas-liquid chromatograhpic techniques, and spectral analysis confirmed the above pentacyclotetradeca-5,11-diene structure. The relative proportions of isomers in this and subsequent examples are shown in Table 1.

The distillation bottoms product consisted principally of a low molecular weight polymer of bicycloheptadiene, believed to be novel, which was isolated as a light tan solid. A molecular weight determination in benzene indicated a molecular weight of 1293±60.

Example II

The procedure of Example I was followed employing 293 millimoles bicyclo(2.2.1)hepta-2,5-diene and 0.79 millimole of tetrakis(trisopropylphosphite)nickel (0) as catalyst. The reaction time was 0.67 hour and the reaction temperature was 150–160° C. The product mixture was shown by fractional distillation to consist of 1.5% wt. recovered feed, 87.8% wt. mixed bicycloheptadiene dimers and 10.7% wt. polymeric product.

Example III

The procedure of Example I was followed employing 271 millimoles of bicyclo(2.2.1)hepta-2,5-diene and 1.84 millimoles of tetrakis(trimethylphosphite)nickel (0) as catalyst. The reaction time was 0.75 hour and the reaction temperature was 155–173° C. The product mixture was shown by fractional distillation to consist of 34.1% wt. recovered feed, 52.1% wt. mixed bicycloheptadiene dimers and 13.8% wt. polymeric product.

Example IV

The procedure of Example I was followed employing 586 millimoles bicyclo(2.2.1)hepta-2,5-diene and 0.34 millimole tetrakis[tri(p-tolyl)phosphite]nickel (0) as catalyst. The reaction time was 1.25 hours and the reaction temperature was 140–170° C. Fractional distillation showed the product mixture to consist of 33.3% wt. recovered feed, 56.4% wt. mixed bicycloheptadiene dimers and 10.3% wt. polymeric product.

Example V

The procedure of Example I was followed employing 195 millimoles of bicyclo(2.2.1)hepta-2,5-diene and 0.95 millimole of bis(tetraphenyl ethylenediphosphite)nickel (0) as catalyst. The reaction time was 1.0 hour and the reaction temperature was 140–160° C. Fractional distillation of the product mixture showed it to consist of 31.0% wt. recovered feed, 57.2% wt. mixed bicycloheptadiene dimers and 11.8% wt. polymeric product.

TABLE I

| Example | I | II | III | IV | V |
|---|---|---|---|---|---|
| Isomer Distribution, percent wt.: Pentacyclo(8.2.1.1$^{4,7}$.0$^{2,9}$.0$^{3,8}$)-tetradeca-5,11-diene isomer: | | | | | |
| A | 23.6 | 43.6 | 12.4 | 13.9 | 5.3 |
| B | 68.8 | 53.4 | 79.7 | 73.2 | 87.6 |
| C | 7.1 | 3.0 | 7.6 | 12.9 | 6.7 |
| Other Dimer | 0.5 | Trace | 0.3 | Trace | 0.4 |

*Example VI*

When 2-methylbicyclo(2.2.1)hepta-2,5-diene (prepared from 2-methyl-1,3-cyclopentadiene and acetylene and boiling at 104° C. at 640 mm.) is dimerized in the presence of tetrakis[tri(2 - ethylhexyl)phosphite]nickel (0) according to the procedure of Example I, a good yield of an isomeric mixture of 5,12(or 11)-dimethylpentacyclo(8.2.1.1$^{4,7}$.0$^{2,9}$.0$^{3,8}$)tetradeca-5,11-diene is obtained.

I claim as my invention:

1. The process of producing a pentacyclo(8.2.1.1$^{4,7}$.0$^{2,9}$.0$^{3,8}$) hydrocarbon 5,11-diene product as essentially the only dimer produced by dimerization of a bicyclo(2.2.1)hepta-2,5-diene, by dimerizing a bicyclo(2.2.1)hepta-2,5-diene having as the only non-hydrogen ring substitutents from 0 to 6 hydrocarbyl substituents independently having from 1 to 10 carbon atoms and having only aromatic unsaturation in the presence of from about 0.0001% mole to about 5% mole based on said bicycloheptadiene of tetrakis(trihydrocarbylphosphite) nickel (0) catalyst wherein the hydrocarbyls independently have from 1 to 10 carbon atoms and have only aromatic unsaturation, at a temperature of from about 80° C. to about 200° C. and a pressure of from about 1 atmosphere to about 100 atmospheres.

2. The process of producing pentacyclo(8.2.1.1$^{4,7}$.0$^{2,9}$.0$^{3,8}$)tetradeca-5,11-diene as essentially the only dimer product produced by dimerization of bicyclo(2.2.1)hepta-2,5-diene, by dimerizing bicyclo(2.2.1)hepta-2,5-diene in the presence of from about 0.0001% mole to about 5% mole based on said bicycloheptadiene of tetrakis(trihydrocarbylphosphite)nickel (0) catalyst wherein the hydrocarbyls independently have from 1 to 10 carbon atoms and have only aromatic unsaturation, at a temperature of from about 80° C. to about 200° C. and a pressure of from about 1 atmosphere to about 100 atmospheres.

3. The process of claim 2 wherein the tetrakis(trihydrocarbylphosphite)nickel (0) is bis(tetraphenyl ethylenediphosphite)nickel (0).

4. The process of claim 2 wherein the trihydrocarbylphosphite is trialkylphosphite.

5. The process of claim 4 wherein the trialkylphosphite is tri(2-ethylhexyl)phosphite.

6. The process of claim 4 wherein the trialkylphosphite is triisopropylphosphite.

7. The process of claim 2 wherein the trihydrocarbylphosphite is triarylphosphite.

8. The process of claim 7 wherein the triarylphosphite is tri(p-tolyl)phosphite.

References Cited by the Examiner

UNITED STATES PATENTS 3,102,899  9/1963  Cannel _____ 260—429
3,152,158  10/1964  Clark _____ 260—666

OTHER REFERENCES

C. W. Bird et al., Chem. & Ind., pp. 20–21 (1960).

C. W. Bird et al., Tetrahedron Letters, No. 11, pp. 373–375 (1961).

DELBERT E. GANTZ, *Primary Examiner.*

V. O'KEEFE, *Assistant Examiner.*